(12) United States Patent
Chiu

(10) Patent No.: US 7,571,895 B2
(45) Date of Patent: Aug. 11, 2009

(54) ROPE SHEAVE

(75) Inventor: Hsien-Juey Chiu, Auckland (NZ)

(73) Assignee: Vetus NV, Schiedam (NL)

( * ) Notice: Subject to any disclaimer, the term of this patent is extended or adjusted under 35 U.S.C. 154(b) by 0 days.

(21) Appl. No.: 11/835,797

(22) Filed: Aug. 8, 2007

(65) Prior Publication Data
US 2008/0157043 A1 Jul. 3, 2008

(30) Foreign Application Priority Data
Aug. 8, 2006 (NZ) .................................... 549053

(51) Int. Cl.
*B66D 1/30* (2006.01)
(52) U.S. Cl. ............................. 254/372; 254/358
(58) Field of Classification Search ................ 254/372, 254/358, 383, 393
See application file for complete search history.

(56) References Cited

U.S. PATENT DOCUMENTS

| 5,314,166 A * | 5/1994 | Muir ........................... 254/371 |
| 5,368,281 A * | 11/1994 | Skyba .......................... 254/391 |
| 6,092,791 A * | 7/2000 | Kingery ........................ 254/371 |
| 6,098,962 A * | 8/2000 | Henly .......................... 254/333 |
| 6,149,133 A * | 11/2000 | Skyba .......................... 254/391 |
| 6,394,421 B1 * | 5/2002 | Henly .......................... 254/365 |
| 6,708,954 B2 * | 3/2004 | Chambers ...................... 254/339 |
| 2004/0149973 A1 * | 8/2004 | Chambers ...................... 254/371 |
| 2004/0149974 A1 * | 8/2004 | Chambers ...................... 254/371 |

FOREIGN PATENT DOCUMENTS

WO WO-84/03341 8/1984

* cited by examiner

*Primary Examiner*—Emmanuel M Marcelo
(74) *Attorney, Agent, or Firm*—Darby & Darby

(57) ABSTRACT

The invention provides a rope sheave having two substantially opposed faces, each face having a plurality of ridges extending from an inner circumferential region of the face to an outer circumferential region of the face. The ridges are arranged such that those portions of the ridges on one face at the inner circumferential region substantially oppose those portions of the ridges on the opposite face at the inner circumferential region, and those portions of the ridges at the outer circumferential region on one face substantially oppose regions between those portions of the ridges at the outer circumferential region of the other face. The faces may be separable to provide two sheave parts.

8 Claims, 7 Drawing Sheets

ROPE SHEAVE

CROSS-REFERENCE TO PRIOR APPLICATION

This application claims priority to New Zealand Application No. 549054, filed on Aug. 8, 2006, which is incorporated by reference herein in it entirety.

FIELD OF THE INVENTION

This invention relates to rope sheaves or similar articles such as pulleys which are used to control or direct the path of a rope (including wire ropes). The invention has particular application to sheaves used in winches, such as marine winches, and to sheaves which may form part of a chain wheel.

BACKGROUND

In order to perform effectively, a rope sheave for a winch or similar application needs to grip the rope effectively. This is usually performed by providing a number of radial ridges or projections on the inner side surfaces of the sheave.

OBJECT

It is an object of the present invention to provide an improved rope sheave or sheave part.

Alternatively, it is an object of the invention to provide a sheave or sheave part which will at least provide the public with a useful choice.

SUMMARY OF THE INVENTION

Accordingly, in one aspect the invention may broadly be said to consist in a rope sheave having two substantially opposed faces, each face having a plurality of ridges extending outer circumferential region on one face substantially oppose regions between those portions of the ridges at the outer circumferential region of the other face.

Preferably the ridges are provided at an acute angle to a radial line from a centre of rotation of the sheave to the outer circumferential region.

Preferably the sheave includes a plurality of chain link engaging projections which project from the outer circumferential region.

Preferably one said ridge extends from each chain link engaging projection.

Preferably each chain link engaging projection has first and second faces, wherein a first of said faces is configured to forcibly drive a chain link in use, and the portion of each ridge extending from the respective chain link engaging portion is disposed between said first and second faces.

More preferably, the portion of each ridge extending from the respective chain link engaging portion is disposed closer to the second face than the first face.

Preferably the ridges on each face become progressively closer to each other from the outer circumferential region to the inner circumferential region.

Preferably the faces are separable to provide two sheave parts.

BRIEF DESCRIPTION OF THE DRAWINGS

One or more embodiments of the invention will be described below with reference to the accompanying drawings in which.

DESCRIPTION OF ONE OR MORE EMBODIMENTS OF THE INVENTION

Figure 1:
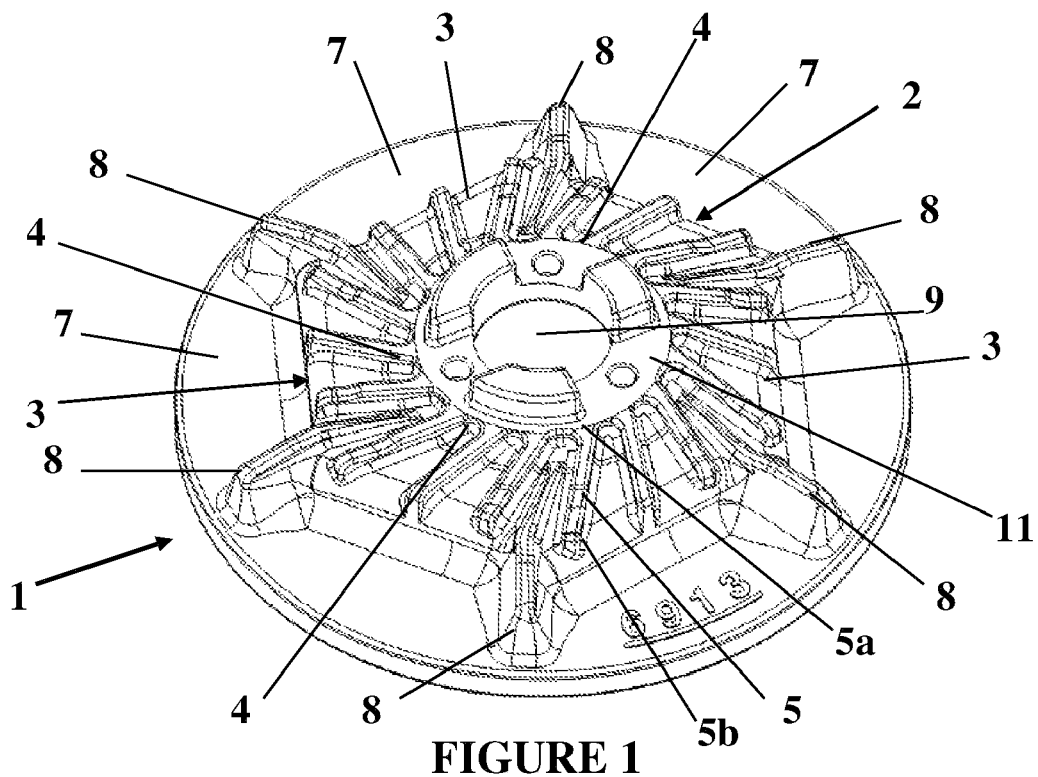
FIG. 1 Is an isometric view of a first sheave part of a first embodiment of the invention.
Figure 2:
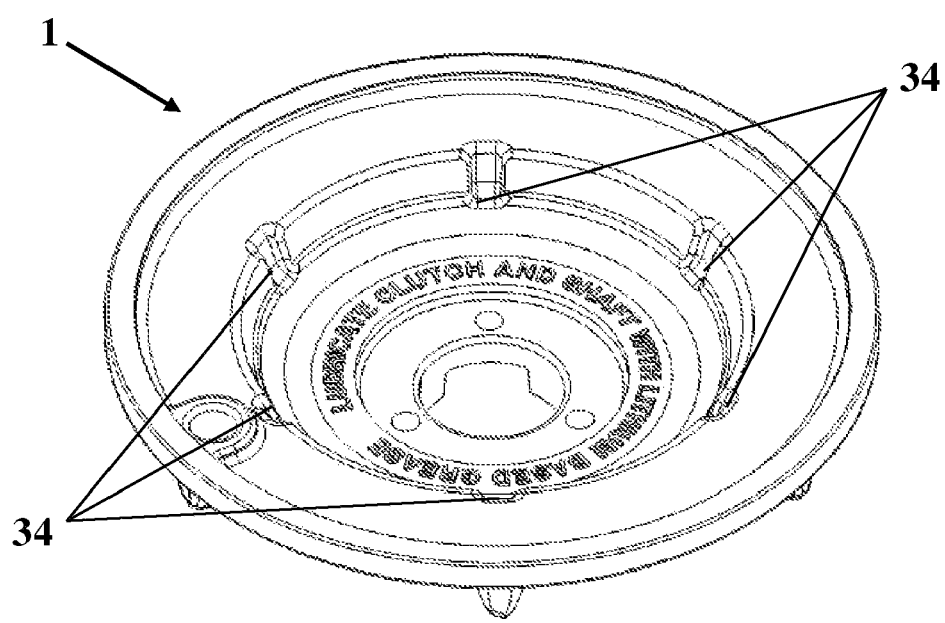
FIG. 2 Is an isometric view of the opposite side of the sheave part of FIG. 1.

Referring to the drawings, FIGS. 1 and 2 show the first part of a first embodiment of a sheave which may be used as a rope sheave, which is generally referenced 1. The sheave has a face which is generally referenced 2 having an inner circumferential region 4 which is adjacent to a hub part 11 of the face, and an outer circumferential region 3 which is spaced from the hub part 11, being provided closer to the periphery of the face. Between the inner and outer circumferential regions, a number of elongate ridges 5 are provided. Those parts of ridges 5 which are at or adjacent to the inner circumferential region are referenced 5a, and those parts which are at or adjacent to the outer peripheral region are referenced 5b. For purposes of clarity, only a selected number of ridges are labelled in the drawing Figures.

Figure 4:
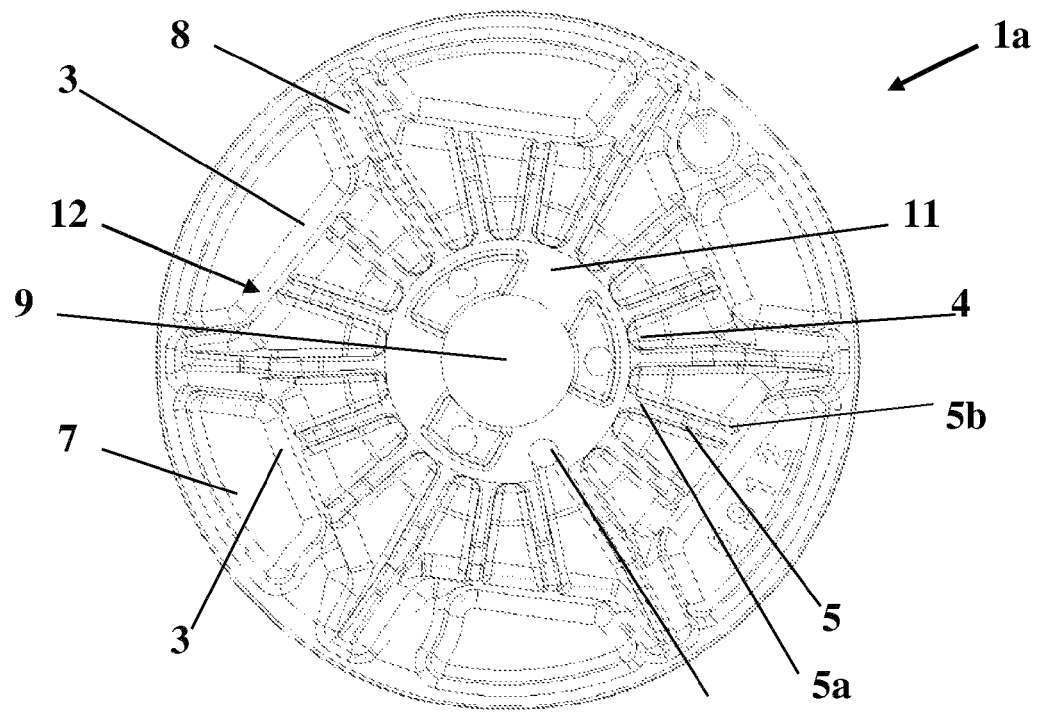
FIG. 4 Is a plan view of a second sheave part according to the first embodiment.
Figure 5:
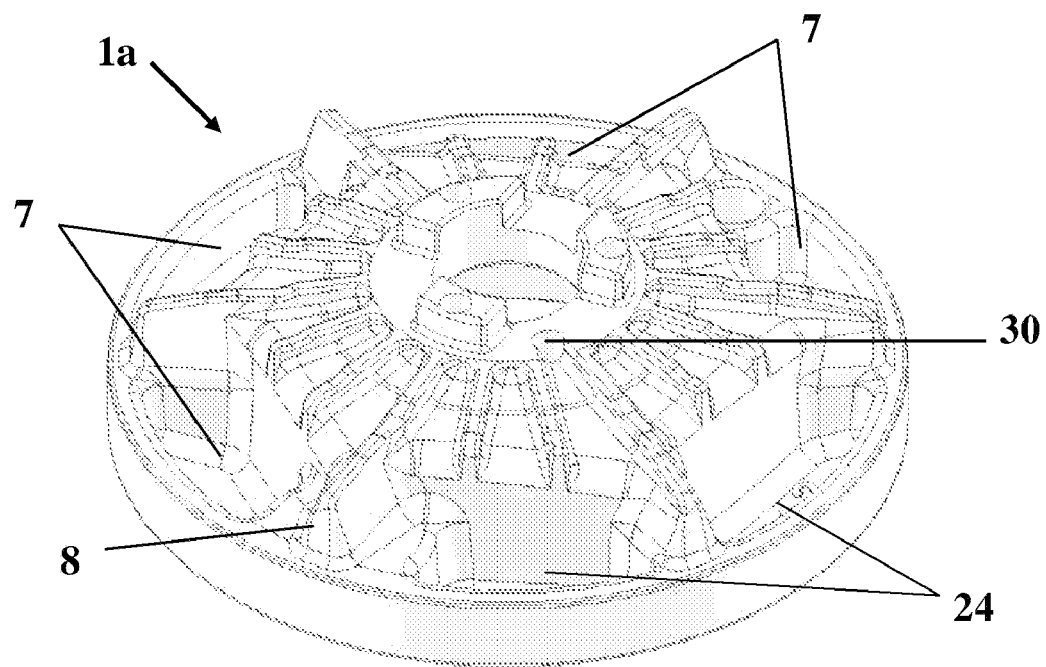
FIG. 5 Is an isometric view of the sheave part of FIG. 4.
Figure 7:
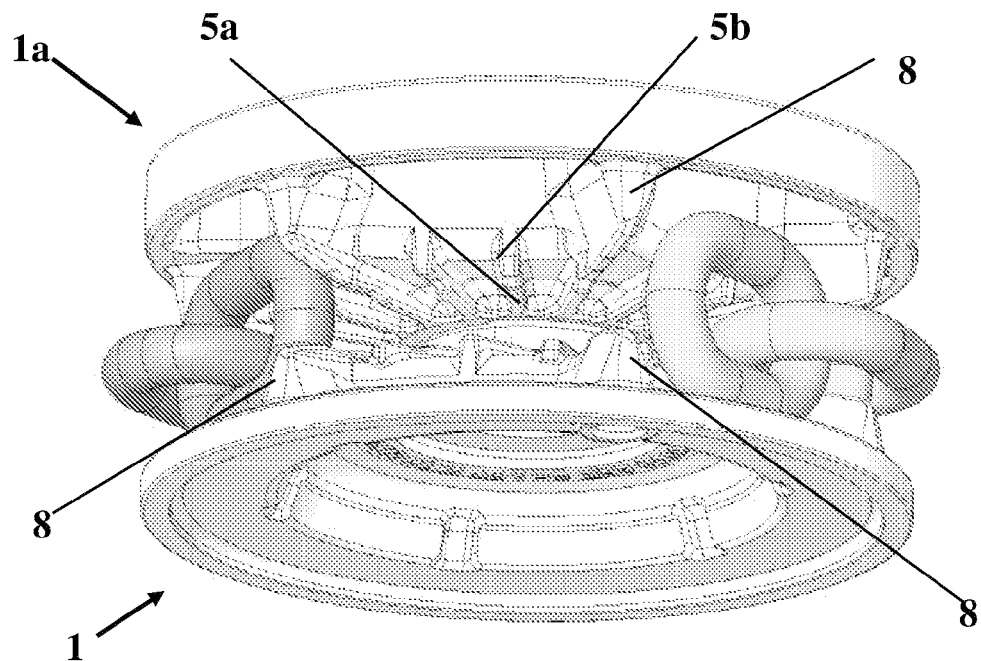
FIG. 7 Is an isometric view of the sheave parts of the preceding Figures being used together to form a rope sheave which also may function as a chain wheel.
Figure 8:
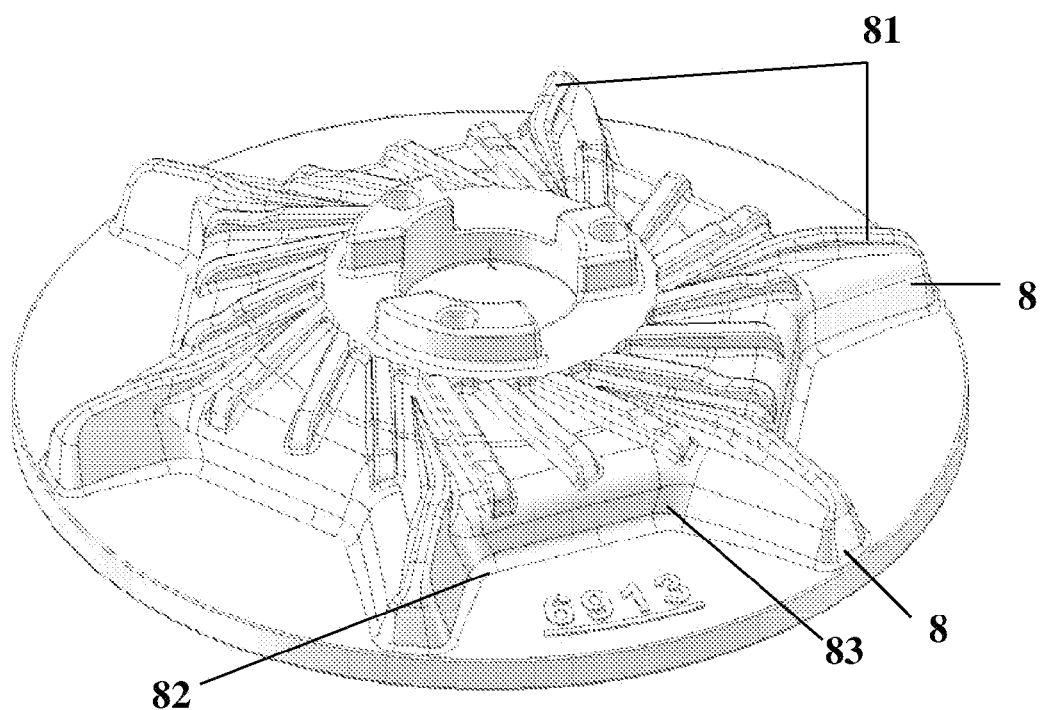
FIG. 8 Is an isometric view of a first sheave part of a second embodiment of the invention.
Figure 9:
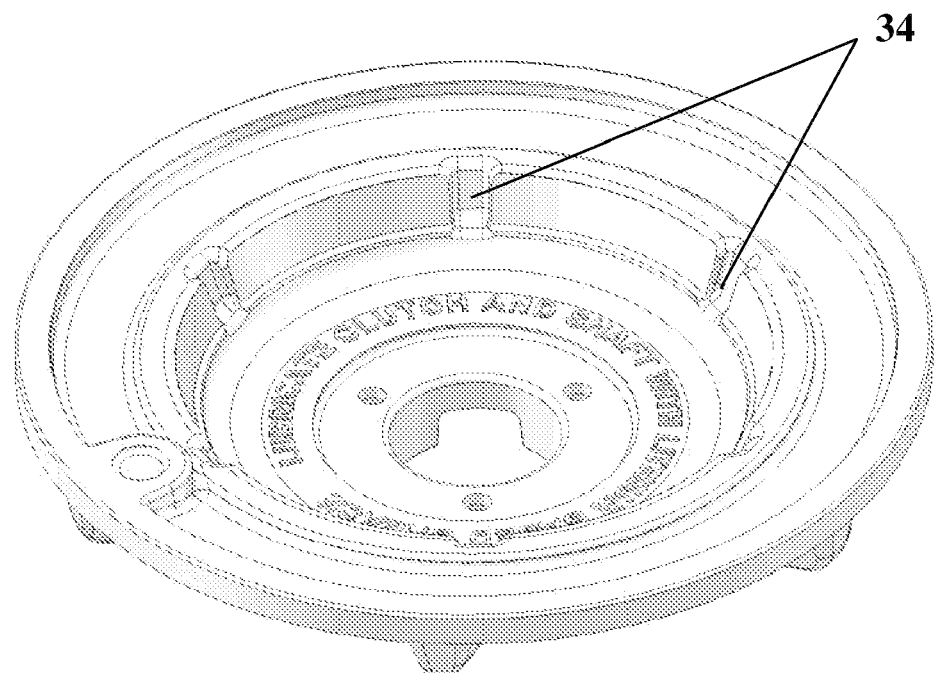
FIG. 9 Is an isometric view of the opposite side of the sheave part of FIG. 8.
Figure 10:
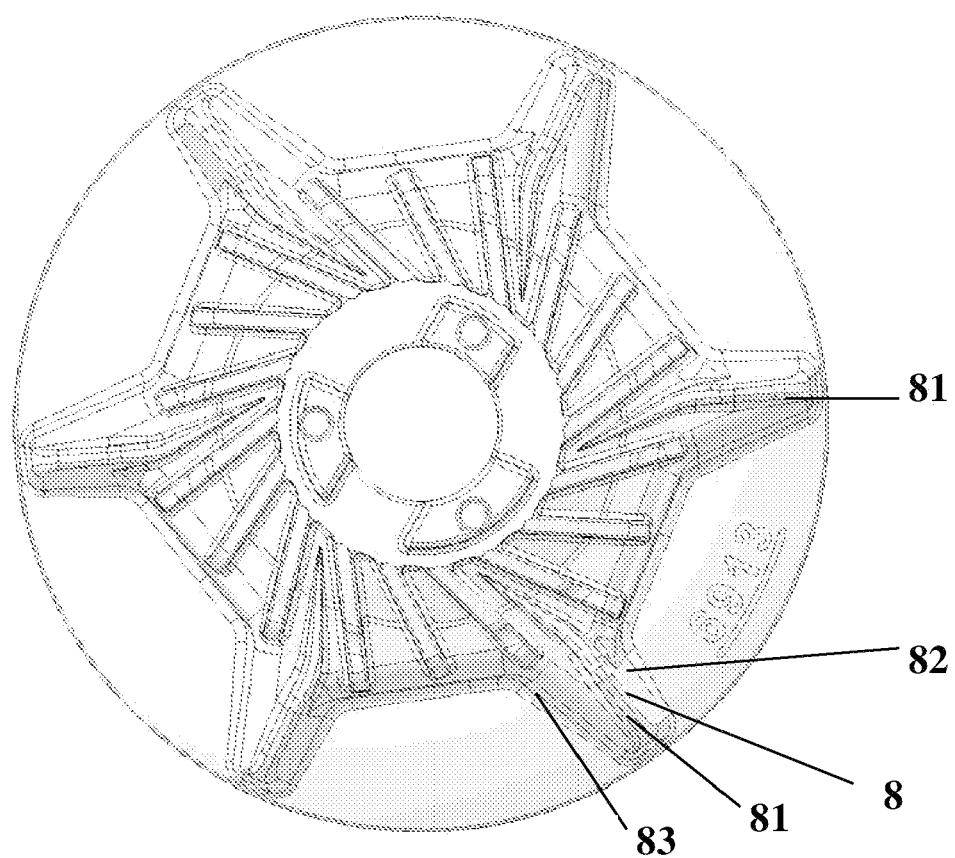
FIG. 10 Is a plan view of the first sheave part of FIGS. 8 and 9.

Referring to FIGS. 4 and 5, the face 12 of the other sheave part 1a of the first embodiment is shown. The two sheave parts are adapted to be used with each other such that face 2 opposes face 12, as illustrated in FIG. 7 of the drawings. Features of the two sheave parts that are the same or substantially similar to each other have the same reference numerals.

As is best seen in FIG. 7, ridge parts 5a of each face substantially oppose each other i.e. those parts of ridges 5 in the inner circumferential region 4 face each other or coincide. However, ridge parts 5b of each face do not oppose each other. Therefore, those portions of ridges 5 on one face in outer region 3 face toward areas between ridges of the opposing face in the outer circumferential region 3. It has been found that this arrangement results in the rope initially entering the sheave and adopting a serpentine or "waved" configuration while the rope is in or near the outer circumferential region 3. This greatly increases the friction between the sheave and the rope. Moreover, as the rope enters further into the sheave i.e., moves further toward the inner circumferential region 4, the increasing coincidence between ridges of opposing faces creates a greater friction or engagement with the rope. Furthermore, the ridges are also arranged so that the distance between ridges on the opposing faces decreases from the outer peripheral region to the inner peripheral region.

Figure 3:
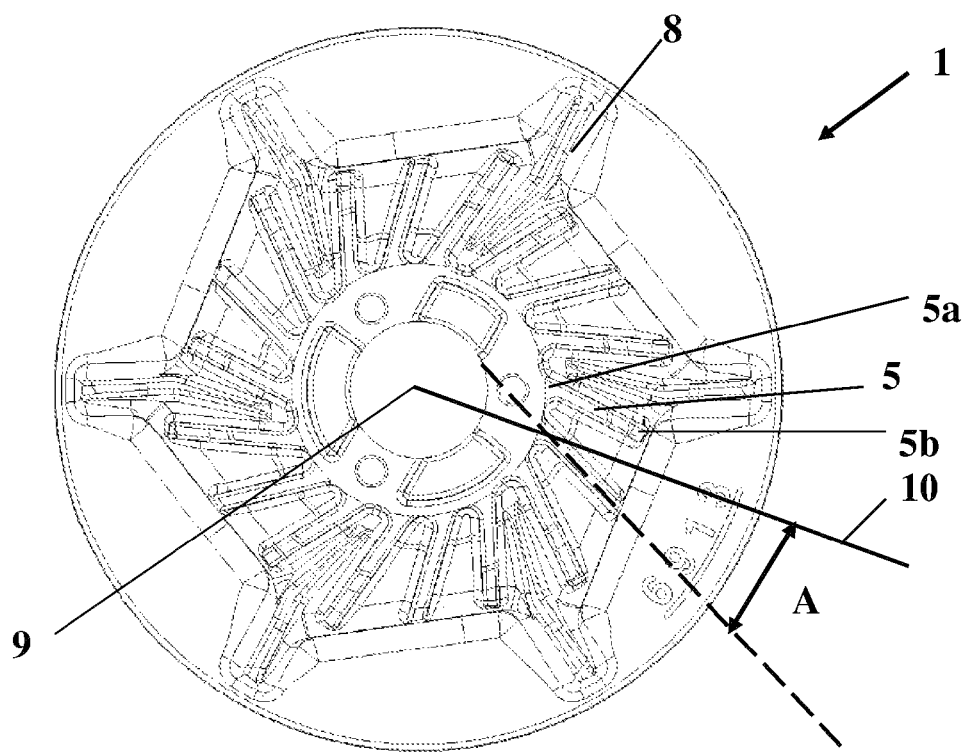
FIG. 3 Is a plan view of the sheave part of FIG. 1.

It will also be seen that in one embodiment of the invention the ridges 5 of one or both of the sheave parts (refer to FIG. 3) are at an angle A relative to a radial line 10 from the centre of rotation to the outer peripheral region. As can be seen, the angle is an acute angle, and is selected to provide the effect described above when used in conjunction with the ridges on the other face. The angle may also be selected to facilitate movement of the rope toward the hub of the sheave.

Furthermore, projections 8 from the outer peripheral region 3 define pockets 7 for receiving links of a chain. Therefore, the construction is such that a rope sheave together with a chain wheel may be provided.

Figure 6:
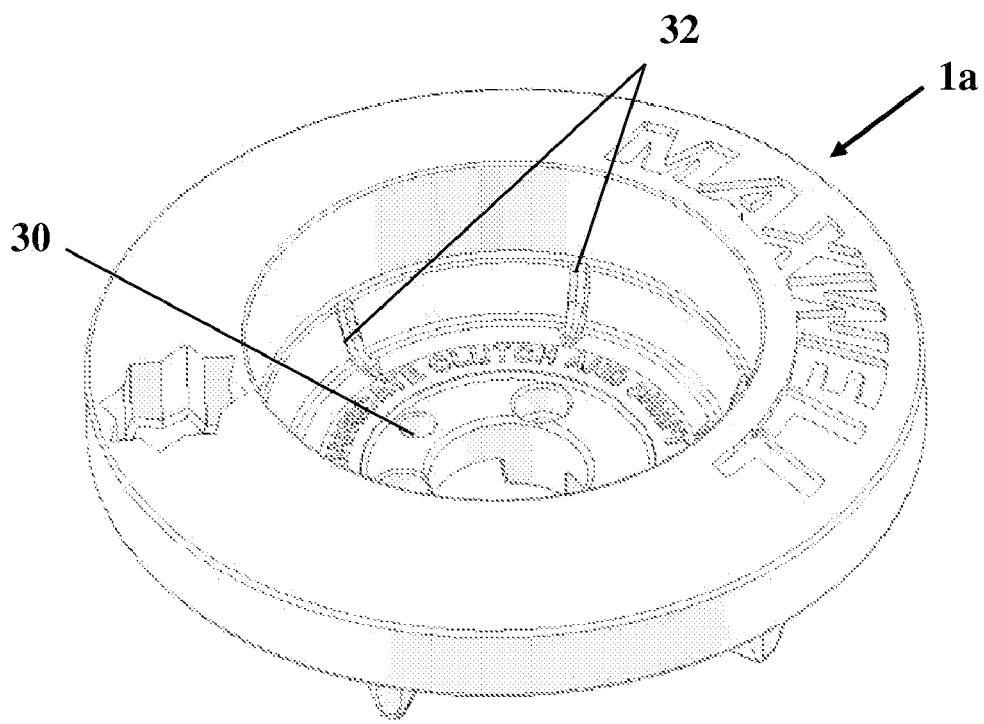
FIG. 6 Is an isometric view of the opposite side of the sheave part of FIG. 4.

Referring to FIGS. 2 and 6, a drainage hole 30 may be provided to facilitate drainage of water or other unwanted fluid in use. Also, recesses 32 and 34 provide grease grooves. The rope sheave assembly is in use driven by a top and bottom clutch cone, and the contact area of the chain wheel with these surfaces means that the grease groves are advantageous for lubricating the chain wheel and clutch cones. This extends the life of the apparatus. The grease grooves also provide a channel for foreign matter to escape from the clutch faces.

Figure 11:
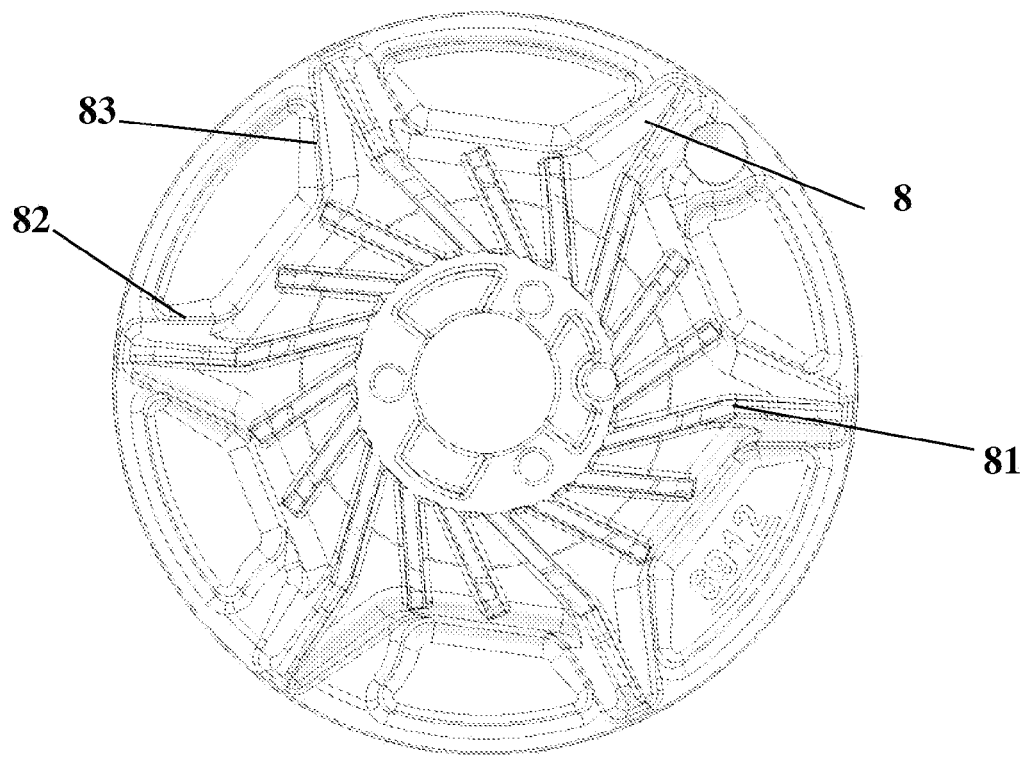
FIG. 11 Is a plan view of a second sheave part according to the second embodiment.
Figure 12:
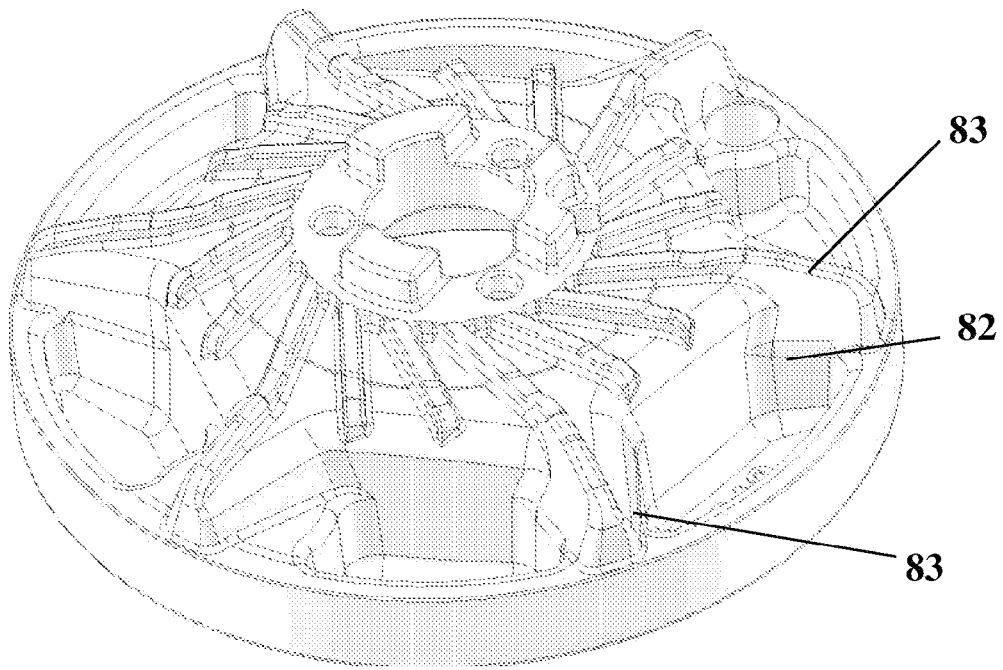
FIG. 12 Is an isometric view of the sheave part of FIG. 11.
Figure 13:
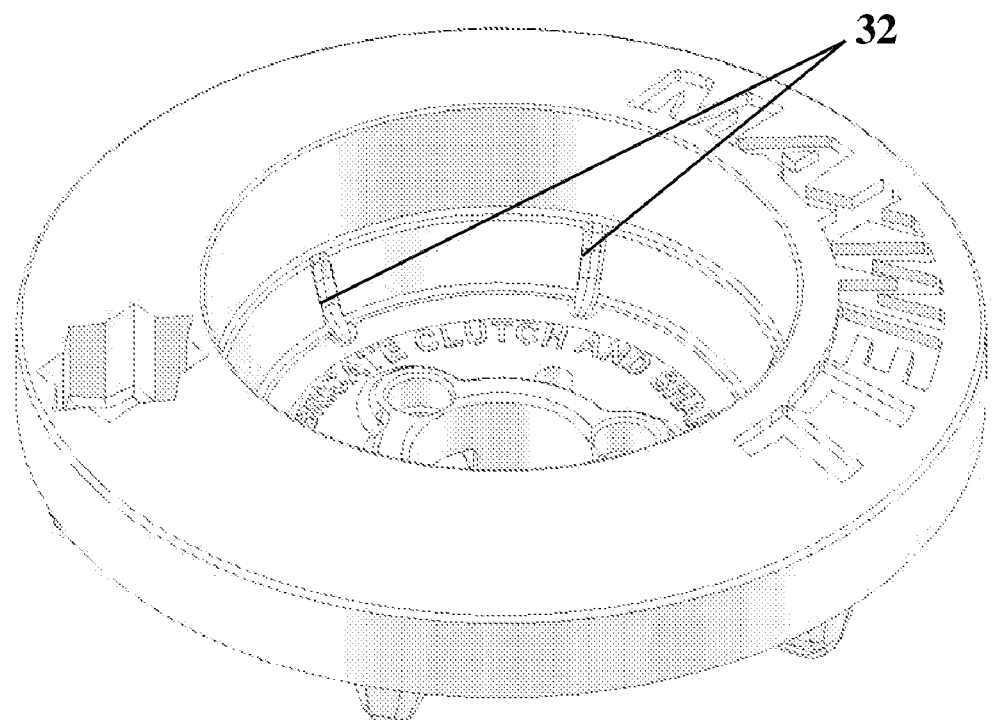
FIG. 13 Is an isometric view of the opposite side of the sheave part of FIGS. 11 and 12.
Figure 14:
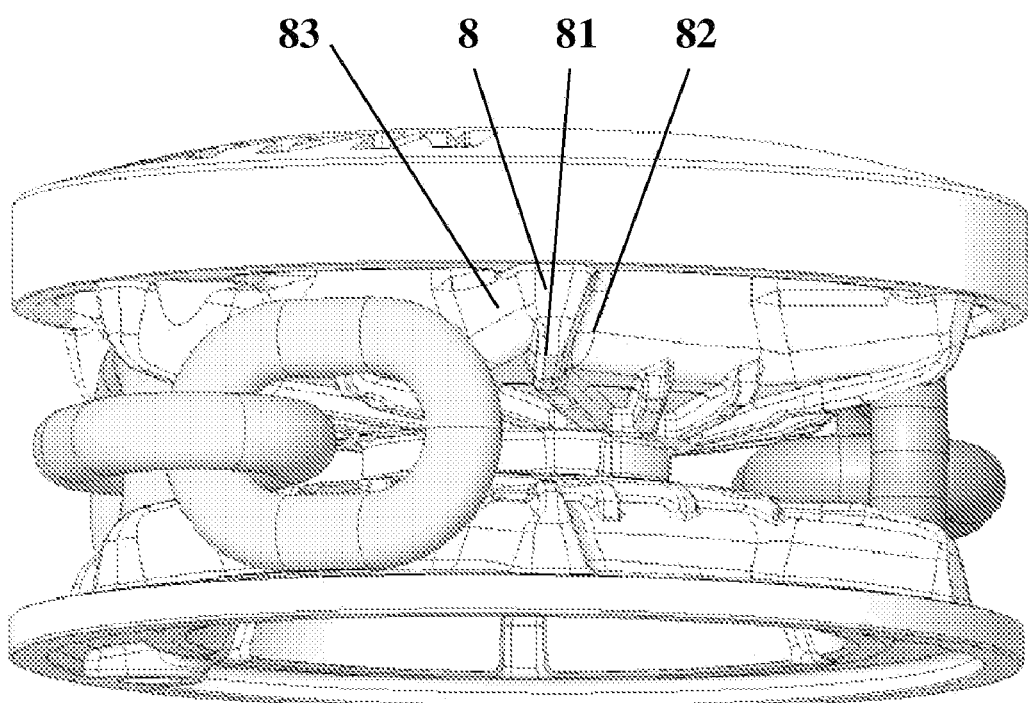
FIG. 14 Is an isometric view of the sheave parts of FIGS. 8 to 13 being used together to form a rope sheave which may also function as a chain wheel.

FIGS. 8 to 15 show first and second rope sheave parts according to a second embodiment of the invention. Many elements of FIGS. 8 to 15 are common with those of FIGS. 1 to 7 and like references have been used for like elements. More particularly, FIGS. 8 to 10 and 14 show a first rope sheave part, FIGS. 11 to 13 show a second rope sheave part and FIG. 15 shows a rope sheave comprising the first and second rope sheave parts of FIGS. 8 to 14. Reference is made to the description in respect of FIGS. 1 to 7 and only distinguishing features of FIGS. 8 to 15 are the subject of specific description.

Referring to FIG. 1, it has been found that when a rope sheave has been used with chain, wear can occur on the upper surface of projections 8. Such wear can lead to the formation of sharp edges which is not desirable, particularly when the rope sheave is subsequently to be used with rope. To address this problem, in the embodiment shown in FIGS. 8 to 15 (see in particular FIG. 8 in combination with FIG. 10), ridges 81 are provided on projections 8, but offset from the centre thereof. More particularly, ridges 81 are provided closer to first face 82 than second face 83. In use, second face 83 is the principal load bearing face used to drive a chain. By offsetting ridges 81 on projections 8 towards first face 82, ridges 81 are subjected to less contact with and wear by chain since discrete or separate surfaces are provided for engaging with chain links and ropes. Namely, ridges 81 engage rope and the second face 83 of projection 8 engages a chain link. This is further facilitated by the stepped profile of second face 83.

Also according to the second embodiment, ridges 5 are oriented differently. Both embodiments have ridges 5 offset from being radial to centre of rotation 9 (see in particular FIGS. 4 and 8) but the offset is greater according to the second embodiment. The increased offset serves to improve the draw of rope towards centre of rotation 9 where the spacing of the opposing faces is reduced (see FIGS. 7 and 15), thereby increasing the grip on the rope.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Wherein the foregoing description reference has been made to specific components or integers of the invention having known equivalents then such equivalents are herein incorporated as if individually set forth.

Although the invention has been described by way of example and with reference to possible embodiments thereof, it is to be understood that modifications or improvements may be made thereto without departing from the scope of the invention.

The invention claimed is:

1. A rope sheave comprising two substantially opposed faces, wherein:
   each face has a plurality of ridges extending from an inner circumferential region of the face to an outer circumferential region of the face;
   the ridges are arranged such that portions of the ridges on one face at the inner circumferential region substantially oppose portions of the ridges on the opposite face at the inner circumferential region; and
   the ridges are arranged such that portions of the ridges at the outer circumferential region on one face substantially oppose regions between portions of the ridges at the outer circumferential region of the other face.

2. The rope sheave of claim 1, wherein the ridges are provided at an acute angle to a radial line from a center of rotation of the sheave to the outer circumferential region.

3. The rope sheave of claim 1, wherein the ridges on each face become progressively closer to each other from the outer circumferential region to the inner circumferential region.

4. The rope sheave of claim 1, comprising a plurality of chain link engaging projections which project from the outer circumferential region.

5. The rope sheave of claim 4, wherein one of the plurality of ridges extends outwards from each chain link engaging projection.

6. The rope sheave of claim 5, wherein:
   each chain link engaging projection has first and second faces;
   a first of said faces is configured to forcibly drive a chain link in use; and
   the portion of each ridge extending from the respective chain link engaging portion is disposed between said first and second faces.

7. The rope sheave of claim 6, wherein the portion of each ridge extending from the respective chain link engaging portion is disposed closer to said second face than said first face.

8. The rope sheave of claim 1, wherein the faces are separable to provide two sheave parts.

\* \* \* \* \*